Nov. 5, 1935.  E. T. BRACE  2,020,133
INCUBATOR
Original Filed April 15, 1932   4 Sheets-Sheet 3

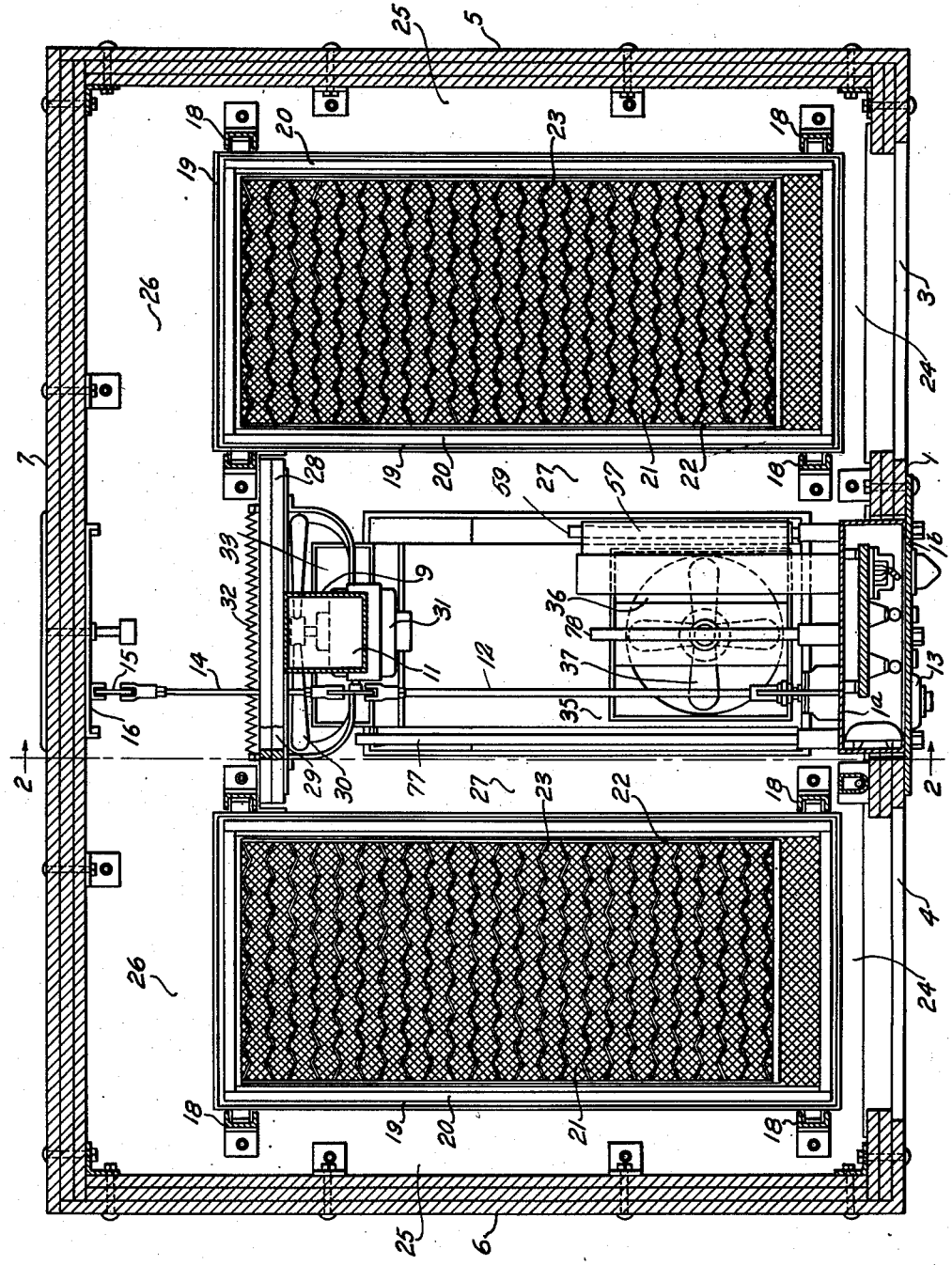

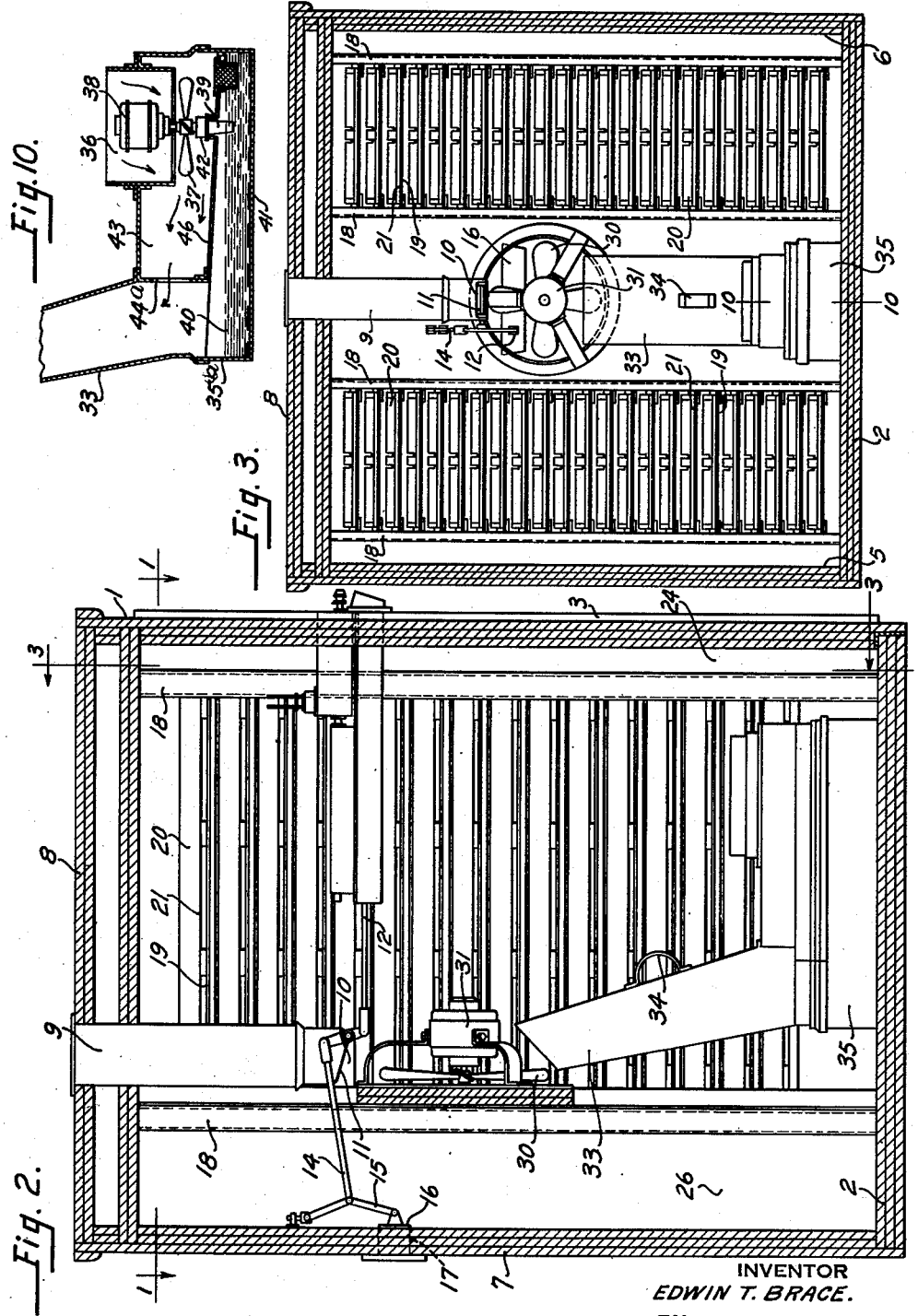

INVENTOR
EDWIN T. BRACE.
BY
Toulmin & Toulmin
ATTORNEY

Nov. 5, 1935.   E. T. BRACE   2,020,133
INCUBATOR
Original Filed April 15, 1932   4 Sheets-Sheet 4

INVENTOR
EDWIN T. BRACE.
BY
Toulmin & Toulmin
ATTORNEY

Patented Nov. 5, 1935

2,020,133

UNITED STATES PATENT OFFICE 2,020,133

INCUBATOR

Edwin T. Brace, Springfield, Ohio, assignor to The Buckeye Incubator Mfg. Company, Springfield, Ohio, a corporation of Ohio Original application April 15, 1932, Serial No. 605,476. Divided and this application October 25, 1932, Serial No. 639,455

11 Claims. (Cl. 119—37)

My invention relates to incubators and hatchers and in particular to that feature dealing with the control of moisture in the incubator.

It is a further object of my invention to provide means of controlling the moisture content, the fresh air content and the heating of the air content within the enclosure constituting the incubator or hatcher.

In particular it is my object to provide a novel form of humidifier and novel means of applying the humidified air to the main air stream as well as extracting a portion therefrom, humidifying it and returning it to the main air stream.

It is a further object to provide means of circulating air in the enclosure with respect to the humidifier in order to thoroughly distribute the humidified air between layers of eggs so that each layer will have humidified air of the same general humidity content applied to the eggs in the layer so that there will be uniformity of application of the moisture to all layers of eggs as distinguished from the previous method sometimes employed of humidifying air and then distributing it so that certain portions of the eggs would secure more humidity than others as in the case when the air is driven first from one layer of eggs to another.

It is my object to provide means of distributing humidified air in its humidified condition, to humidify the air at each circuit and to apply the same degree of humidity to each layer of eggs.

This application is a division of my copending application, Ser. No. 605,476, filed April 15, 1932, and a continuation in part of my application, Ser. No. 605,406, filed April 15, 1932.

Figure 1 is a section on the line 1—1 of Figure 2.

Figure 2 is a section on the line 2—2 of Figure 1.

Figure 3 is a section on the line 3—3 of Figure 2 with the heating wires omitted.

Figure 10 is a section on the line 10—10 of Figure 3.

Figure 4:
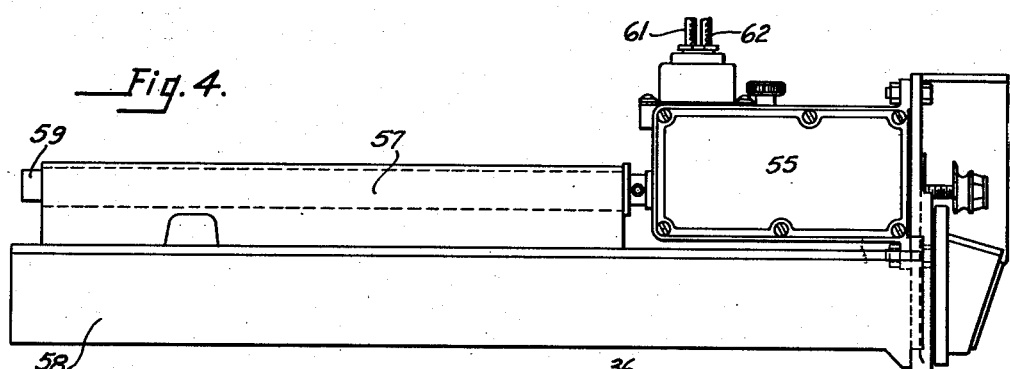
Figure 4 is a side elevation of the humidifier control.

Referring to the drawings in detail, 1 represents the front of an incubator having a bottom 2 and front doors 3 and 4. 5 and 6 indicate the side walls and 7 the back while 8 designates the top. The top is provided with an air inlet chute 9 discharging at 10 provided with a damper 11. This damper is operated by the pitman 12 which in turn is operated by a motor 13. The front wall has an opening between the doors for an instrument casing 1a covered by a panel 1b.

The damper 11 is connected to the pitman 14 which in turn is connected to the links 15 that operate the air exit damper or exhaust 16 controlling the port 17.

The interior of the enclosure is provided with spaced uprights 18 carrying spaced solid bottom trays 19 carrying egg trays 20 having wire mesh bottoms 21. Within these trays reciprocate smaller frames 22 having egg turning rods 23. The forward ends of the stacks of trays are adjacent the doors 3 and 4, while the rear ends are spaced a greater distance from the back 7 of the enclosure. There is a passageway, however, all the way around the stacks of trays as in front at 24, on the outside at 25, the back at 26 and between the trays at 27. A fan plate or housing 28 is vertically disposed between the rear ends of the trays, this plate having an aperture 29 through which the fan 30 blows air from the space 27 to the space 26, the air traveling in a horizontal path so that it will circulate between the egg trays as each tray is embraced on its top and bottom by a solid bottom part or tray 19, so that the air must circulate over the eggs in each tray independently of any other eggs in any other tray. The fan 30 is driven by a suitable motor 31.

Figure 8:
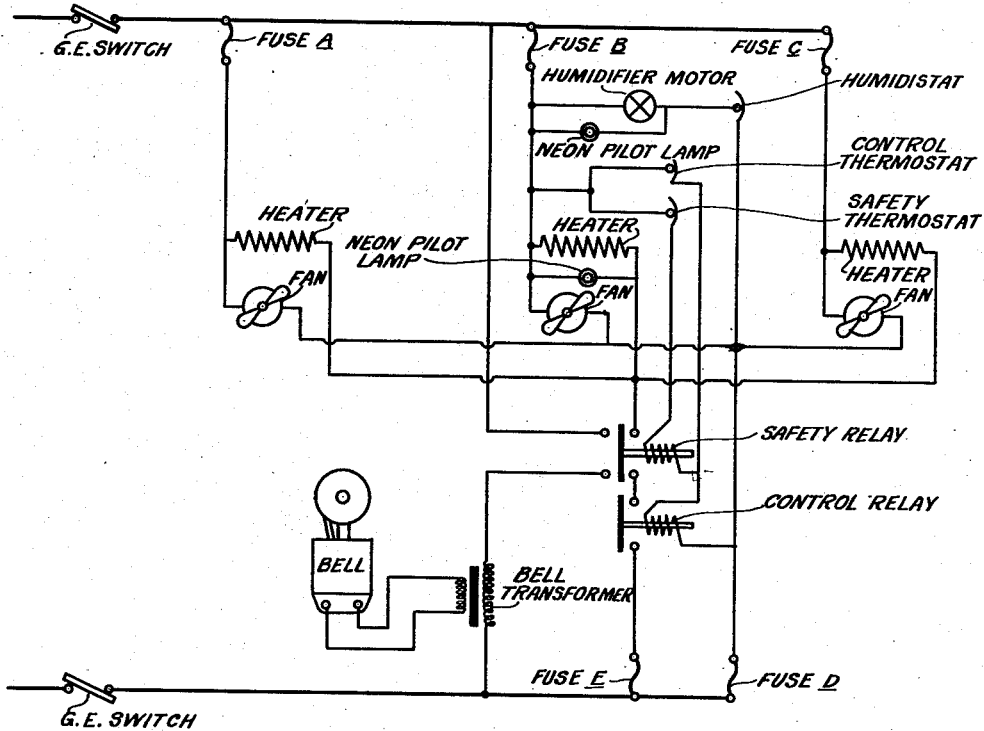
Figure 8 is a wiring diagram showing the humidifier, heat and fan control.
Figure 9:
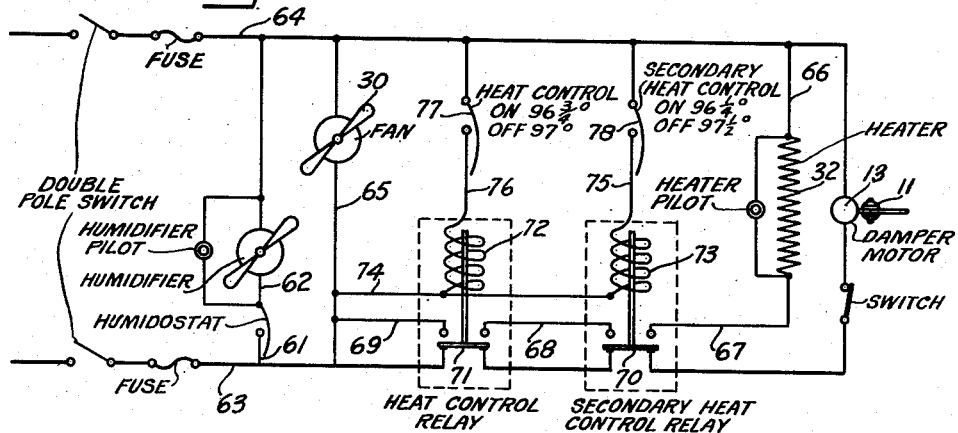
Figure 9 is a modified view showing the electric circuit controlling the humidifier, the fans, the heat and the admission of fresh air to the enclosure.

It will be understood that there may be a plurality of these fans and a plurality of these motors as indicated in Figure 8. Across the face of the fan are electric resistance heating wires 32.

Discharging into the inlet side of the fan is a chute 33 which communicates with the humidifier 35 and has thereon a handle 34.

Figure 5:
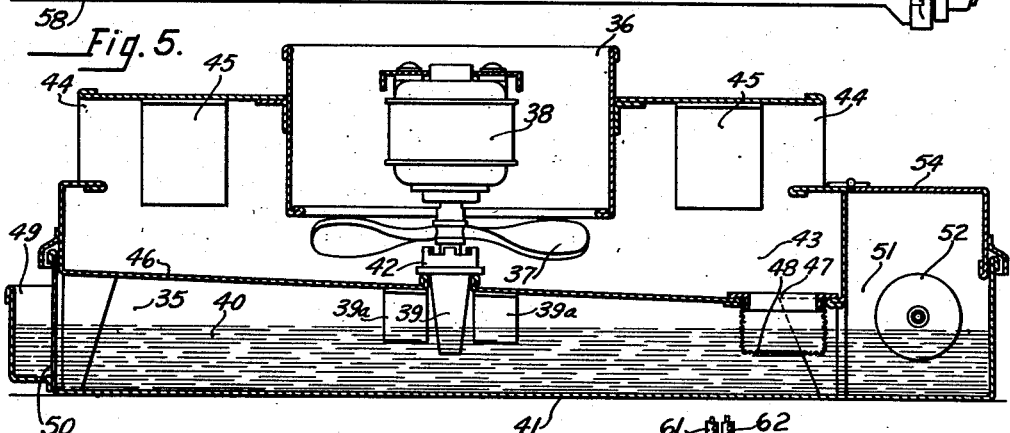
Figure 5 is a vertical section through another form of humidifier.
Figure 7:
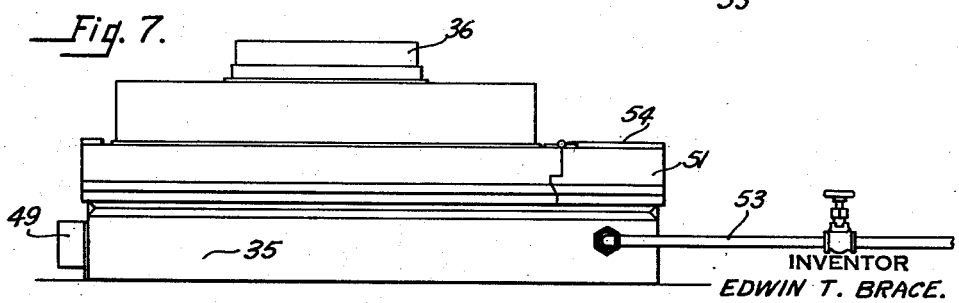
Figure 7 is a detailed side elevation of the humidifier shown in Figure 5.

Referring to the form shown in Figures 5 and 7, the humidifier 35 is provided with an air inlet 36. The air is induced to enter by the fan 37 operated by the motor 38.

This fan operates the pump 39, one end of which projects into the water 40 in the water pan 41 and the other end of which is provided with a spray distributor 42 which delivers a spray into the chamber 43, whence the air makes its exit through the exit ports 44 around the baffles 45 or the air may be discharged through the chute 33 if that is employed. The baffles serve to scrub the air to remove surplus moisture and solid matter therefrom. The form of humidifier shown in Figures 5 and 7 is similar in all respects to the form shown in Figure 10 with the exception that in Figure 10 one chute 33 is provided whereas in the form shown in Figures 5 and 7 two such chutes may be used, one for each exit port 44. When these chutes are attached to the exit ports 44 they direct the air from the humidifier upwardly and into the horizontally disposed main stream of incubating air.

It will be noted that the floor of the space 43 is designated 46 and is inclined to a sump 47 having a wire bottom 48. This sump is removable. The forward end of the water pan 41 is provided with a filler cup 49 communicating through the port 50 with the water pan 41, the rear end of which communicates with a float chamber 51 which has a float 52 controlling the introduction of water in the usual manner from a pipe line 53. The float chamber is provided with a hinged cover 54. Associated with the water motor or pump 39 are baffles 39a depending from the bottom 46 of the chamber 43.

The dry air laden with fluff from the chicks or other foreign material is drawn in through the casing 36 which forms a motor housing and motor support. This air is discharged into the water spray. The water and fluff run downhill on the sloping bottom 46 to the sump strainer 47 where the fluff is maintained in a wet condition at all times so that it will not be taken up by the air stream. The dry air having deposited its burden by turning at right angles and slowing down, at the same time secures its load of moisture, passes over the baffles 45 and out the port 44 into the horizontally circulating air stream.

In the form shown in Figure 10 the air leaving the port 44a at one end is discharged through the vertical chute 33.

The starting and stopping of the motor fan 37 is controlled by the humidostat 55 (see Figures 4 and 6) which has an expansible and contractible tube 59 affected by the temperature variation caused by the evaporation of the moisture from the wick 57 dipping into the trough 58 and mounted on the tube 59. The movement of the expansible tube 59 in the following manner springs or unsprings the humidostat contact spring 56 which opens and closes the contacts 60 controlling the circuit through the wires 61 and 62 so as to start and stop the humidifier fan 37.

To the outer end of the expansible tube 59 is attached the outer end of the rod 59a, the latter passing loosely through the inner end of the tube 59. The rod 59a is of relatively inexpansible material, and thus transmits the expansion and contraction of the tube 59 to the remainder of the apparatus.

The inner end of the rod 59a is threaded, as at 62c, and on this threaded portion is mounted a nut 62e, engaging a lever 62a pivotally mounted upon the frame of the humidostat, as at 62b. The rod 59a passes loosely through the lever 62a and also through the casing of the humidostat. The outer end of the rod 59a is rotatably mounted in the outer end of the tube 59 so that it may be turned by turning the adjusting knob 62f, this operation causing the nut 62e to advance or recede along the threaded portion 62c of the rod 59a. The casing of the humidostat 55 is provided with a fixed block 61a, suitably insulated and having a notch adapted to receive one end of a contact spring 56. The other end of the contact spring 56 is received in a similar insulated notch in the end of the lever 62a. The mid-point of the contact spring 56 is provided with a contact stud 56a, which is adapted to engage a similar contact stud 60 in the end of the range screw 62d. The wire 61 is connected to the fixed block 61a, and thence to the contact spring 56, whereas the wire 62 is connected to the range screw 62d.

Figure 6:
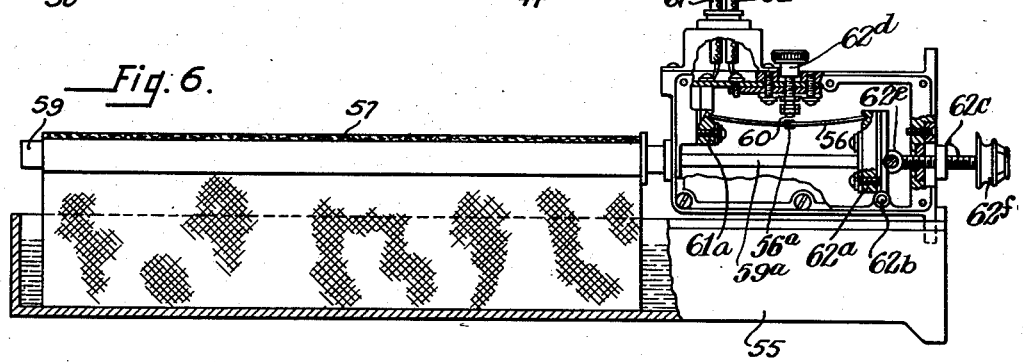
Figure 6 is a side elevation partially in section of the humidifier control.

The operation of the humidostat 55 depends upon the fact that the dry bulb temperature is kept substantially constant within the compartment in which the humidostat is located. Consequently, the amount of evaporation of liquid from the wick 57 into the air surrounding it will depend upon the humidity of this air. If the humidity rises, the evaporation from the wick 57 decreases, and consequently the temperature of the tube 59 rises because it is not cooled by this evaporation. The tube 59 expands because of its rising temperature, and pulls the rod 59a to the left (Figure 6). The latter also pulls the nut 62e to the left, moving the upper end of the lever 62a to the left and bowing the contact spring 56 downward, separating the contact 56a from the contact 60. This breaks the energizing circuit of the humidifier fan motor 38, causing the humidification to be suspended. It will be observed from Figure 6 that this operation is a "snap" operation, namely, that a certain amount of energy is required to be built up before the contact spring 56 bows, the action then occurring with a quick snap.

When the humidity falls, the wick 57 is enabled to evaporate more moisture, cooling the tube 59 and causing it to contract. As it contracts, its outer end moves toward the right, pushing the rod 59a to the right and with it the nut 62e on the threaded portion 62c thereof. This permits the upper end of the lever 62a to move to the right, allowing the contact spring 56 to flatten out and permit its contact 56a to engage the contact 60 upon the range screw 62d. The energizing circuit of the humidifier fan motor 38 is thereby closed and humidification of the air is resumed.

By turning the knob 62f, the temperature at which the spring 56 flexes may be accurately and precisely adjusted. By turning the range adjustment knob 62d, on the other hand, the point at which the spring contact 56a engages the movable contact 60 may also be accurately adjusted.

The wires 61 and 62 are connected in circuit to the main supply lines 63 and 64. Across these lines is the fan circuit 65 containing a fan 30. The heat circuit 66 containing the heater 32 is connected from the main circuit 64 to the fan circuit 65 through the wires 67, 68 and 69. These wires are bridged by the cross-over switches 70 and 71 operated by the respective coils 73 and 72. One end of each of these coils is connected to the fan circuit by the wire 74. The other ends of the coils are respectively connected by the wires 76 and 75 through the primary thermostat 77 and the secondary thermostat 78 respectively to the wire 64.

In operation, the heat is normally cut on and off by the primary thermostat 77 and maintained between the ranges of 96¾° and 97°. If the heat rises above 97°, the heating circuit is cut off by the movement of the cross-over switch 71 from the wires 68 and 69 to the terminals in the wires 63 just below. The heat being cut off when the temperature rises above 97 degrees the temperature usually drops below 97 degrees. And when the temperature falls below 96¾ degrees the switch 71 connects the wires 68 and 69.

If the heat continues to rise due to the animal heat in the incubator, the secondary thermostat will open at 97½° F., closing the circuit 63 by the cross-over switch 70, thereby energizing the damper motor to open the damper and admit fresh air. When the temperature falls below 96¼ degrees F. the switch 70 will close, through the operation of the thermostat 78. The thermostat 77 having already closed the switch 71, heat is now turned on. Whether the heat circuit is operating or the fresh air circuit is operating makes no difference to the humidostat, which will open and close according to the moisture content within the cabinet. The fan 30 also continues to operate continuously.

Figure 8 shows a system of wiring in which there is included a control thermostat for cutting off the heat when a certain determined temperature has been reached. In the event that this control does not operate and the temperature reaches a sufficiently high degree, a safety thermostat is operated to move the safety relay for forming a circuit through the primary of a bell transformer, to the secondary of which transformer is connected a bell for giving the alarm. When this bell rings it is an indication that the temperature has reached or is approaching the danger point, and personal attention must be given to the operation of the incubator.

I desire to comprehend within my invention such modifications as may be clearly embraced within the claims and the scope of my invention.

Having thus fully described my invention, what I claim as new and desire to secure by Letters Patent, is:

1. In an incubator, in combination with a stack of spaced superimposed egg trays, means to prevent air passing from one tray to the other upwardly or downwardly, means of circulating the air between said trays horizontally, means for extracting from said horizontally moving air streams a portion of the air, incorporating moisture with it, and returning said moisture laden air to be moved again in horizontal air streams, said last mentioned means comprising a motor and fan, a hydrostat, and means connecting said hydrostat to said motor and fan for operating said motor and fan when the air moving in horizontal paths between said eggs needs the incorporation of moisture therein.

2. In combination in an incubator, means to move the air in said incubator in a stream, means to extract a portion of said air, humidify it and return it to the main air stream, and to scrub said extracted air to remove therefrom foreign material, returning it to the main air stream in clean, moist condition, and means remotely located from the means applying moisture to the air affected by the moisture in the main air stream adapted to control the introduction of moisture to the main air stream.

3. In an incubator, the combination of a main fan moving the air in a stream in the incubator over the eggs, a supplementary fan extracting air from the main air stream, means operated in conjunction with said supplementary fan for humidifying the extracted air which is redelivered to the main air stream, and hydrostat means in the main air stream adapted to control the fan humidifying the air.

4. In combination, in an incubator, a main air fan for moving air in the incubator in a stream, a humidifier fan adapted to extract air from the stream, humidify it and return it to the inlet of the main air fan in humidified condition, and means engaging one wall of the incubator and actuated by the moisture condition in the air for starting and stopping the humidifier fan.

5. In combination in an incubator, means to heat air including a heating circuit, a primary thermostat controlling the heating circuit, a secondary thermostat controlling said heating circuit, a damper motor having a circuit, a damper operated by the motor, a fan having a circuit connected in parallel with the heating circuit and the damper motor circuit, a humidifier, a humidifier fan and a humidifier fan circuit, and a humidostat controlling said humidifier fan circuit.

6. In combination, a main circuit having a damper motor therein, a heating circuit thereacross, a fan having a fan circuit across the main circuit, said heating circuit being adapted to be connected to the fan circuit, a humidifier fan, a humidifier fan circuit across the main circuit, a humidostat in the humidifier fan circuit, a primary thermostat and switch to control the damper motor circuit and the heat circuit, a secondary thermostat and a secondary switch to control said damper and heat circuits, said circuits being so arranged that the humidostat may operate when either the heat circuit or damper circuit is in operation, said first-named fan being adapted to create a current of air and the second-named fan being adapted to take air from the current and return it to the current.

7. In combination, an incubator, a continuously operating main fan and an intermittent humidifier fan, a humidifier, a humidostat controlling said humidifier fan, damper means to admit fresh air to said incubator, a motor for the damper means, means to heat said incubator, primary and secondary thermostats operated at different temperatures to control said heating means and the motor, and a common supply circuit for said main fan, humidifier fan, heater and damper motor.

8. The combination, in an incubator, of an open cabinet, spaced parallel stacks of trays spaced from one another and from the side walls of the cabinet, a separating plate having a fan opening extending from one stack of trays to the other and spaced from the back wall of the cabinet, and a fan in said fan opening whereby air is driven against the back of the cabinet, is directed to the right and the left, and thence passes between the trays.

9. In an incubator, egg-carrying trays arranged horizontally, means for moving the air in the incubator in a stream horizontally between the egg-carrying trays, and movable means to extract only a part of the air circulating within the incubator, humidify it and return it to the main air stream, said air-returning means comprising a conduit adapted to direct the humidified air from the zone of humidification to the point of entry of the air into the air-moving means.

10. In an incubator, in combination with a stack of superimposed egg trays, means to prevent air passing from one tray to the other upwardly or downwardly, means to circulate the air horizontally between said trays, and movable means within the incubator for extracting from said moving air streams a portion only of the air circulating within the incubator, incorporating moisture therewith, and returning said moisture-laden air to the main air stream to be moved again in horizontal air streams, said air-returning means comprising a conduit adapted to direct the humidified air from the zone of humidification to the point of entry of the air into the air-moving means.

11. In combination in an incubator, a main air fan for moving air in the incubator in a stream, a humidifier fan adapted to extract air from the stream, humidify it and return it to the inlet of the main air fan in humidified condition, and means actuated by the moisture condition in the air for starting and stopping the humidifier fan.

EDWIN T. BRACE.